UNITED STATES PATENT OFFICE.

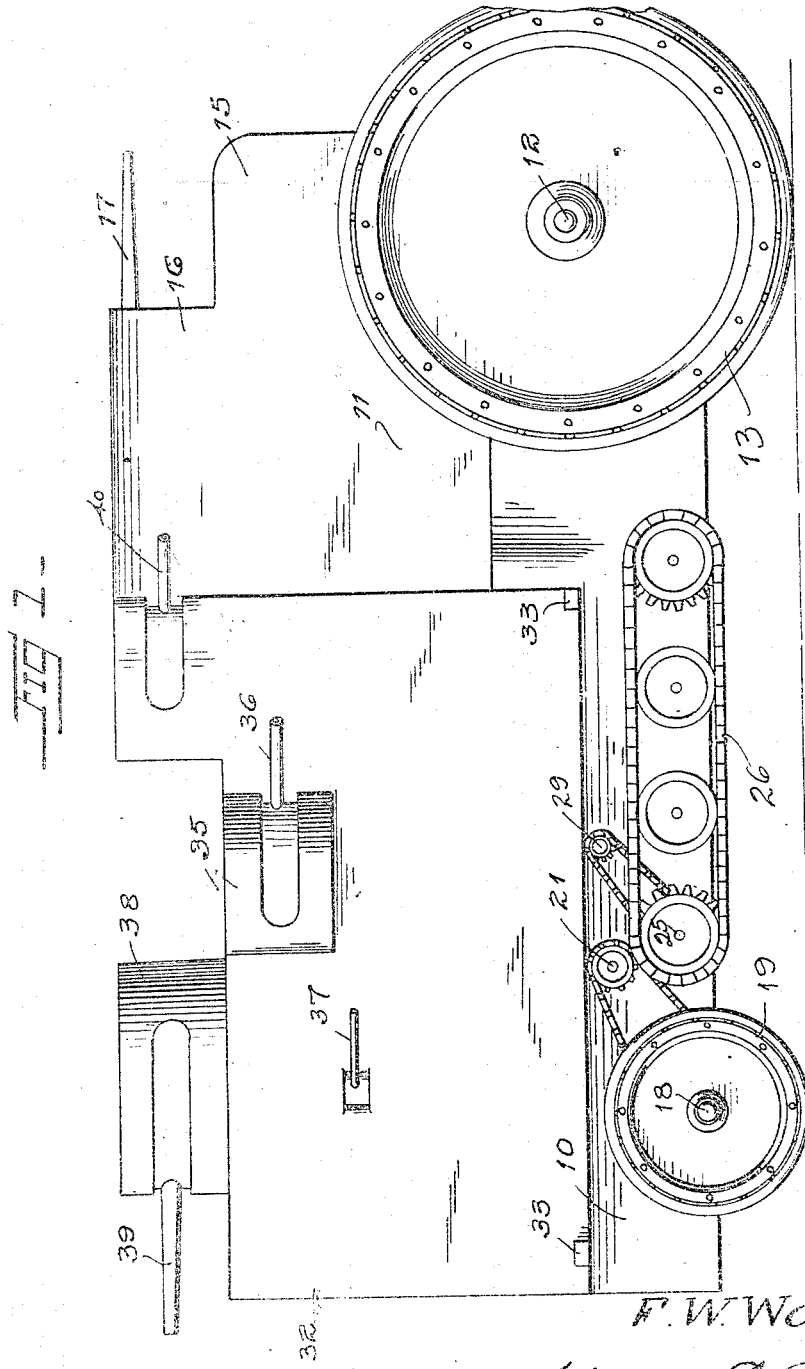

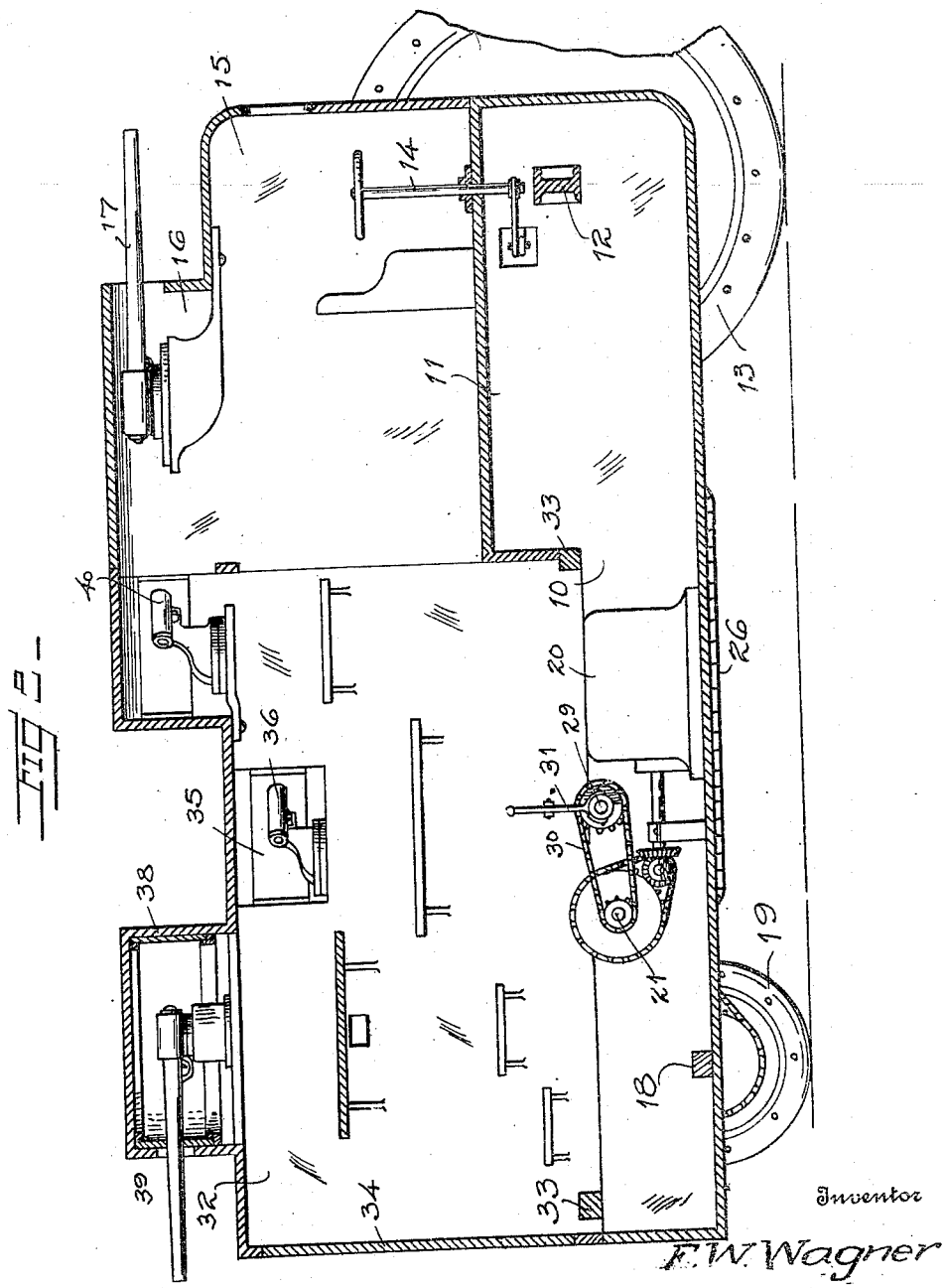

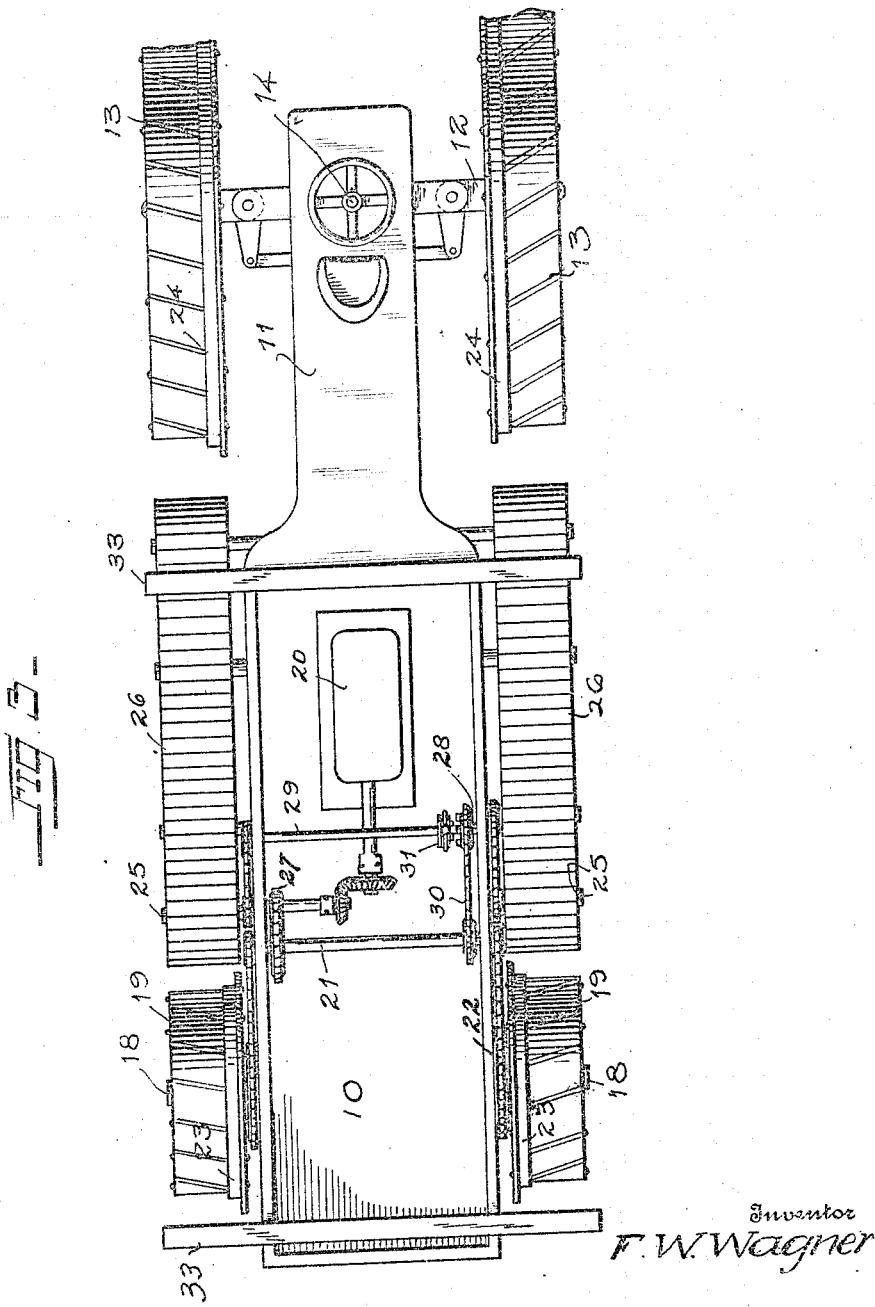

FREDRICK W. WAGNER, OF DETROIT, MICHIGAN.

ARMORED WAR-TANK.

1,292,170.              Specification of Letters Patent.        Patented Jan. 21, 1919.

Application filed July 17, 1918.   Serial No. 245,325.

*To all whom it may concern:*

Be it known that I, FREDERICK W. WAGNER, a citizen of the United States, residing at Detroit, in the county of Wayne, and State of Michigan, have invented certain new and useful Improvements in Armored War-Tanks, of which the following is a specification, reference being had to the accompanying drawings.

This invention relates to armored vehicles, and particularly to war tanks.

The general object of the invention is to provide a tank having a greater capacity than the ordinary tank, whereby a larger crew may be carried and whereby more guns may be mounted upon the tank, and to provide a tank with driving wheels and crawlers which may be used for the propulsion of the tank when the tank is operating in mud into which the wheels of the tank will sink.

Still another object is to provide a tank, the super-structure of which may be removed from the body to thereby permit the body to be used as a motor truck for carrying munitions or other supplies, the forward end of the body having an upwardly extending armored shield.

A further object is to provide a tank having a wheel supported body, a super-structure erected thereon for carrying and housing the pilot of the tank, and a rapid fire gun, the body of the tank being provided with very large steering wheels at its forward end and with driving wheels at its rear end and to provide a removable super-structure or rear housing having rapid fire guns mounted therein, and having upon its roof a rapid fire gun mounted to swing in any desired direction, the rear end of the housing being provided with a door whereby entrance may be had to the ank.

Other objects will appear in the course of the following description.

My invention is illustrated in the accompanying drawings, wherein:—

Figure 1 is a side elevation of an armored tank constructed in accordance with my invention;

Fig. 2 is a vertical sectional longitudinal view thereof; and

Fig. 3 is a top plan view thereof, the super-structure of the tank being removed.

Referring to the drawings, it will be seen that the body 10 of the tank has side walls and that at the forward end of the body, the ends are extended upward as at 11, this forward portion of the body of the tank being relatively narrow. An axle 12 passes through the forward portion of the tank, and mounted thereon are the steering wheels 13 which preferably have a width of about 16 inches and a diameter of about 10 feet. These steering wheels are controlled by any suitable steering gear and a steering shaft 14 which is disposed within a compartment 15 within which the pilot of the machine sits, the front wall of this compartment having suitable opening through which the pilot may observe the course of the machine. Rearward of the compartment 15, the side walls are upwardly extended as at 16 and disposed within this portion 16 is a rapid fire gun 17 extending out through a suitable opening and mounted for adjustment both as regards elevation and lateral movement.

The rear end of the body is carried upon a shaft 18 having thereon the relatively wide driving wheels 19, these driving wheels being preferably about 4 feet in diameter and 28 inches wide. Disposed within the body is the internal combustion engine or motor 20 operatively connected to a main driving shaft 21, which is in turn connected, as by sprocket chains 22 to the rear driving wheels 19. Preferably these rear driving wheels are provided with detachable flanges 23 and detachable flanges 24 are also provided for the front steering wheels. These flanges may be held in place on the wheels by bolts. This will permit the wheels to travel on railroad tracks, it being designed that the wheels shall have the same gage as the railroad tracks in ordinary use.

In order to provide for the propulsion of the tank, either by crawlers, that is, an endless tractor chain or belt, or by the rear traction wheels, I mount upon the body the transverse shafts 25 carrying the endless tractor chain 26 on each side of the machine. One of these shafts carries upon it the driving wheel 27 and this shaft is operatively connected to the driving shaft 21 in any suitable manner. Thus, for instance, I have shown this shaft as connected by means of a driving wheel 28 to a shaft 29 which in turn is driven by means of a sprocket chain 30 from the shaft 21. A suitable clutch 31 is provided whereby the shaft 21 may be shifted into or out of operative driving engagement with the sprocket wheel over which the driving chain 30 passes.

Preferably an armored housing 32 is provided which is detachably mounted upon the body and which I have illustrated as mounted upon transverse supporting beams 33. This housing 32 may be removed so as to permit a truck body to be disposed upon the frame of the machine so that the vehicle may be used as a truck when not used as a fighting tank. This housing 32 is provided at its rear end with a door 34 whereby to provide for the exit and entrance of soldiers into the tank, this door being normally closed, of course. The side walls of the housing 32 are provided with the outwardly projecting or overhanging sponsons 35 from which project the rapid fire or machine guns 36, the wall of each sponson being horizontally slotted for the projection of the gun, and the gun carrying a shield which will cover this slot in all positions of the gun. Rapid fire guns 37 also project through the side walls of the housing.

Mounted upon the top of the housing is a turrett 38 within which is disposed a rapid fire gun 39 which is so mounted that it may be turned in all directions. The front wall of the housing 32 is also provided with openings through which project rapid fire guns 40, these guns being provided with shields to protect the gunner in all positions of the gun.

I design that this armored tank shall have a length over all of 30 feet and a height of about 15 feet, the extreme width of the body being about 10 feet. Preferably the tank will be composed of plates three-fourths of an inch in thickness and will be driven by a 50 horse power engine. The wheels are preferably to be provided with solid rubber tires with very heavy axles. Means should be provided whereby a good ventilation may be secured for the engine room which would be preferably separated from the remainder of the tank by a separate housing. The crawler or caterpillar tractor is to be used in going over trenches and embankments and in case the car stalls or the wheels sink into the mud, the caterpillar tractor can be thrown into gear to force the machine out. Because of the large wheels the tank is able to go over rough ground and trenches. Preferably a search-light will be mounted upon the tank so that it may be used in night work, and preferably the body will be supported upon the axles by springs.

On relatively hard ground the tank or armored car proceeds by means of its own wheels, but where the tank is operating through deep mud the supporting wheels will sink into the mud and in this case the crawler chains will engage the mud and propel the tank therethrough. The same is true to a certain extent where the tank moves over a slight hill or like obstruction. In this case when the front wheels pass the obstruction and dip down over the obstruction, the crawler chains will engage the obstruction to assist in propelling the tank forward.

It will also be noted that when the rear portion of the armored body is removed, that a body is provided, the front portion of which extends upward and forms a shield to protect the supplemental body which is disposed upon the base and designed to carry munitions and for other transportation purposes. Thus the tank is convertible either into a fighting machine entirely armored or into an army truck, the forward portion of which is armored.

While I have illustrated a form of my invention which I believe to be particularly effective for the reasons stated, yet it is obvious that many changes may be made in the details of construction and arrangement of the parts without departing from the spirit of the invention as defined in the appended claims.

I claim:—

1. A tank comprising a supporting body having steering wheels and driving wheels and having an armored compartment at the front end of the body, means for steering the tank disposed in said armored compartment, a motor mounted upon the body and operatively connected to the driving wheels thereof, and a detachable housing supported upon the body and provided with port holes, and guns projecting therefrom, each of the guns being adapted to swing in a horizontal plane and carrying a shield.

2. A tank of the character described comprising a body having front steering wheels and rear driving wheels, the forward portion of the body being formed to provide a relatively narrow and relatively high armored compartment, the body of the tank rearward of this compartment being laterally extended to a width greater than the compartment and having openings for the projection of rapid fire guns and having means for the support of a detachable truck body.

In testimony whereof I hereunto affix my signature in the presence of two witnesses.

FREDRICK W. WAGNER.

Witnesses:
 EUGENE K. PATRICK,
 WILLIAM O. MCPHERSON.